March 1, 1960　　　　B. W. OSWALT　　　　2,926,499

HYDRAULIC MECHANISM

Filed March 14, 1958

INVENTOR.
BURLIN W. OSWALT
BY
John D. Haney
ATTY.

2,926,499
Patented Mar. 1, 1960

2,926,499

HYDRAULIC MECHANISM

Burlin W. Oswalt, Union, Ohio, assignor to The B. F. Goodrich Company, New York, N.Y., a corporation of New York Application March 14, 1958, Serial No. 721,510

5 Claims. (Cl. 60—54.5)

This invention relates to hydraulic systems and more particularly to an improved hydraulic "lock out" mechanism especially useful in hydraulic brake systems for isolating the fluid in that branch of the hydraulic system directly connected with a fluid brake motor (hereinafter called the brake actuating fluid) from the fluid pressure source for operating the brake motor (hereinafter called the line fluid). In addition to this function, the mechanism of this invention is adapted to automatically replenish the brake actuating fluid as needed to compensate for line leakage, slight wear, etc. in the fluid motor and the brake.

The mechanism of this invention functions to isolate the brake actuating fluid from the line fluid both under "low pressure conditions" when the brake is disengaged, and under "high pressure conditions" when the brake is engaged. Separate sealing means is provided in the mechanism for each of these conditions. Under low pressure conditions, the mechanism is adapted to oppose the static or "back" pressure of the line fluid and thus relieve the brake motor and brake mechanism from the burden of sustaining this back pressure force when the brake is disengaged. Under high pressure conditions the mechanism is adapted to transmit the high pressure of the line fluid to the brake actuating fluid but to maintain these fluids isolated from each other. Hence if a rupture occurs in the brake line or there is a failure of the brake motor, the line fluid cannot escape and disrupt the entire hydraulic system.

The brake actuating fluid is automatically replenished from the line fluid as needed each time the brake is released. The replenishment flow occurs during the period from the instant the brake or fluid motor is de-energized until the brake system has reached its normal released state. The mechanism functions to replenish the actuating fluid in accordance with the actual volume of actuating fluid which is lost. It thus insures that the hydraulic brake motor and its actuating fluid are always full of fluid and materially reduces maintenance required for the system.

Figure 1:
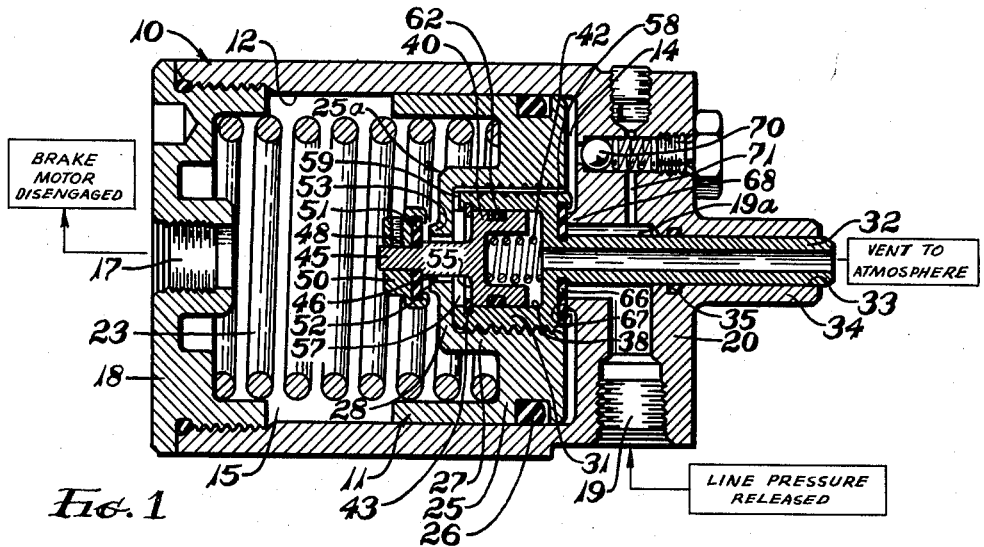
Figure 2:
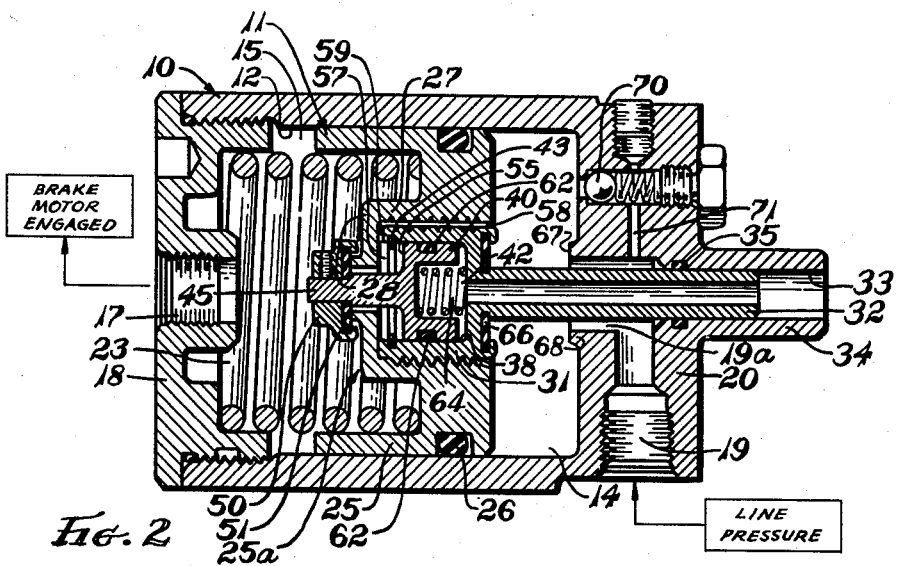

The invention will be further described with reference to the accompanying drawings in which:

Fig. 1 is a longitudinal axial view of one form of mechanism constructed in accordance with and embodying this invention; the view showing the condition of the mechanism when a brake motor associated therewith is disengaged; and Fig. 2 is a view similar to Fig. 1 but showing the condition of the parts of the mechanism when the associated brake motor is fully engaged.

The mechanism includes a casing 10 inside of which there is a fluid pressure responsive member in the form of a floating piston assembly 11 adapted to reciprocate in a bore 12 through the casing from a retracted position as in Fig. 1 to an extended or energized position as in Fig. 2. The regions inside the casing on opposite sides of the floating piston assembly constitute fluid inlet and fluid outlet chambers 14 and 15, respectively, and these chambers are entirely filled with fluid when the mechanism is installed in a brake system. Such a system is only schematically illustrated in the drawings, the mechanism fitting in series between a brake motor and a suitable pressure generator such as a master cylinder or the like (not shown). The outlet chamber 15 is in communication with the brake motor through an outlet opening 17 through an end cap 18 which encloses the open end of the casing. The inlet chamber 14 is connected with the line pressure through a port 19 formed in the bottom wall 20 of the casing. In the illustrated embodiment of the invention the inlet port 19 is formed radially in end wall 20 and connects with an axial inlet port 19A in the center of bottom wall 20.

Caged in the fluid outlet chamber 15 is a main spring 23 which acts against the floating piston assembly 11 to bias it rightward toward its retracted position in Fig. 1. In the retracted position of Fig. 1, spring 23 resists the back pressure of the line fluid acting on the opposing or inlet side of assembly 11.

The floating piston assembly 11 includes a rigid skirted piston 25 having a dynamic O-ring seal 26 about its periphery engaging bore 12. At the center of piston 25 there is an annular hollow hub 25a open toward the inlet chamber 14. This hub is formed with an annular wall 27 and radial wall 28. Threaded into the annular wall 27 from the open side of the hub 25a is an annular hollow cup-shaped housing 31 having a tube 32 integral therewith and projecting axially from the housing. Tube 32 extends concentrically through the axial inlet port 19A and then slidably through a bore 33 formed through the bottom 20 of the casing and through an external boss 34 thereon to the region outside the casing. Bore 33 is sealed about the tube 32 by an O-ring 35.

The cup-shaped housing 31 includes an internal bore 38 defining a valve chamber inside the hub in which is received a piston valve body 40. The piston valve body 40 is also cup shaped and is biased by a spring 42 toward a lock ring stop 43 seated in bore 38 near the mouth of housing 31. Spring 42 is caged under compression between the bottom of housing 31 and the inside bottom surface of the piston valve body.

The piston valve body 40 further includes an integral stem 45 which projects forwardly and through a central port 46 in the radial wall 28 of the piston 25. At the terminus of the stem outside the hub 25a there is fastened (by set groove 48) an annular rigid disc 50 having a rubber sealing face 51 directed toward and facing an annular opposing sealing surface 52 formed on a boss 53 rimming the central port 46. The sealing face 51 on disc 50 seats on surface 52 to seal the actuating fluid in outlet chamber 15 from the inlet fluid 14 under high pressure conditions as hereinafter explained; the piston valve 40 being adapted for displacement in bore 38 against spring 42 to draw the sealing face 51 into sealing engagement with the annular sealing surface 52 as in Fig. 2 during forward movement of the floating piston assembly in actuating the brake motor.

To effect displacement of the piston valve body 40 against its biasing spring 42, the body 40 has an annular actuating surface 55 surrounding the base of stem 45. This surface of body 40 together with the opposing radial wall 28 of piston hub 25a defines an annular fluid channel 57 to which fluid is supplied from inlet chamber 14 through a passage 58 through the threaded junction of housing 31 and the hub portion 25a of main piston 25. Passage 58 is connected to channel 57 through an additional passage 59 through the rim of an inner housing 31 in front of lock ring stop 43. The fluid thus supplied to channel 57 acts directly against annular surface 55 of the body 40 and is capable of overcoming biasing spring 42 whenever the inlet chamber fluid pressure is raised to full-line pressure.

When the high pressure seal (sealing disc 50 and sealing face 51) is open as in Fig. 1, the annular channel 57 is also in communication with the outlet chamber 15 through the central port 46 which is substantially greater in diameter than the stem 45 extending therethrough. Hence inlet and outlet chambers 14 and 15 under these conditions are in direct communication through the open central port 46 and through the passages 58 and 59 and channel 57.

The piston valve body 40 is sealed in sliding engagement with the bore 38 of the inner housing 31 by an O-ring 62 to prevent leakage of fluid from channel 57 past the body 40 into the region inside housing 31 behind body 40. This latter region (designated by numeral 64) is always maintained empty of fluid so that the body 40 can be reciprocated freely in the bore 39.

While it has been found that a seal in the form of O-ring 62 is entirely suitable for preventing leakage into the region 64, use of tube 32 connected to the housing 31 provides a means for venting region 64 to the external surroundings of the casing 10 and thus insures proper functioning of body 40 even if O-ring 62 should fail. Thus if under any circumstances leakage or failure should occur of the O-ring 62, the fluid collecting in the region 64 will be drained through tube 32. The tube reciprocates in bore 33 through the sleeve-like boss 34 as the floating piston assembly is moved axially through the casing 10.

In the retracted position (Fig. 1) of the floating piston assembly 11, an annular rubber sealing disc 66 mounted on the inner housing 31 around the base of tube 32 engages an annular sealing seat 67 formed on a boss 68 at the bottom of the casing rimming the axial inlet opening 19a. When the brake is non-energized and thus the line pressure is released, the biasing force of main spring 23 against piston 25 presses the sealing disc 66 tightly against seat 67 to resist the static or back pressure of the line fluid. It may be noted in Fig. 1 that only a comparatively small annular area of disc 66 is exposed to the back pressure of the line fluid in the retracted position. The pressure inside the casing in both the inlet and outlet chambers under these conditions is equalized at the comparatively low pressure produced by the force of the brake retractor springs (not shown) of the brake mechanism. The sealing disc 66 and its engaging seat 67 form the low pressure seal of the mechanism, this seal preventing passage of fluid from the casing 10 into the brake line and vice-versa when the brake is disengaged.

The bottom 20 of the casing includes a spring-loaded ball check valve 70 operable to open and relieve pressure inside casing 10 should an extreme rise in pressure inside the casing occur while the brake is disengaged. Such a pressure rise may be brought about if the brake supply fluid should become unduly hot or by some malfunctioning of the brake motor. The ball check valve 70 when open is adapted to bypass fluid from the inlet chamber 14 through bypass passage 71 to the inlet passages 19a connected to the line supply pressure.

Summary of operation

When the line supply fluid is pressurized, the high pressure line fluid acts through inlet port 19 and 19a against sealing disc 66 to displace the floating piston assembly 11 leftward, thereby raising the fluid in inlet chamber 14 to full line pressure. The floating piston assembly 11 is thus advanced through the casing against the opposition of main spring 23 to expel fluid from outlet chamber 15 to the brake line, and thereby energize the brake motor. Simultaneously with the initial movement of the floating piston assembly, the inlet fluid in the chamber 14 acts through the passages 58 and 59 and in channel 57 against the actuating surface 55 of the pressure sensing piston 40 to displace piston body 40 and overcome spring 42. Thus stem 45 of the piston body 40 is displaced axially through the central port 46 to draw the high pressure seal 51 tightly against its annular seat 52 in the position shown in Fig. 2. The fluid in outlet chamber 15 is then sealed off from the fluid in the inlet chamber 14 throughout the motion of the floating piston assembly to its energized position in Fig. 2.

The volume of fluid in the outlet chamber 15 is preferably well in excess of the displacement volume of the brake motor so that under maximum braking energy conditions the maximum braking energy may be developed substantially before the floating piston assembly 11 is bottomed against end cap 18 of the casing 10. Fig. 2 shows the approximate position of the floating piston assembly 11 under full braking power. It is desirable to maintain a reserve volume of fluid in the outlet chamber 15 in the order of 50% of the required displacement volume of the brake motor.

Upon release of line pressure the highly compressed main spring 23 immediately expands to force the floating piston assembly 11 rightward toward the bottom wall 20 of the casing, thereby displacing the inlet fluid from chamber 14 backward into the fluid supply line. Since in a hydraulic system in which this mechanism is normally used the back pressure in the outlet chamber 15 (produced by the retractor spring of the brake) is ordinarily very much lower than the opposing or static release pressure of the supply line fluid, the mechanism is designed so that the main spring 23 exerts a retracting force on the floating piston assembly 11 well in excess of the difference between the opposing fluid forces on the opposite sides of the piston 25 after the line fluid pressure is released.

Simultaneously with the release of line fluid pressure, the high pressure seal 51 is immediately opened so that there is a communication between the inlet and outlet chambers 14 and 15 via the passages 57 and 58, the chamber 57 and the port 46. This result occurs because with the reduction of line pressure of fluid in inlet chamber 14, the spring 42 immediately expands to force the piston body 40 forward against its lock ring 43. Therefore, throughout the retraction movement of the floating piston assembly 11 under the influence of main spring 23, fluid from the inlet chamber 14 can leak through the open port 46 into the outlet chamber 15 to replenish the fluid supply in this chamber as needed to keep this outlet chamber entirely filled with fluid. In this manner any loss due to leakage at the brake motor or the fittings on the brake line between the mechanism shown and the brake motor can be replenished. Inasmuch as the floating piston assembly 11 substantially scavenges the inlet chamber 14 as it returns to its retracted Fig. 1 position, the return speed of the floating piston assembly is retarded by the throttling of the inlet fluid through the inlet openings 19 and 19a for a period sufficient to enable replenishing flow to occur and maintain the outlet chamber 15 entirely full of fluid.

When the piston reaches its fully retracted position, the low pressure seal 66 engages seat 67 to seal the line fluid from communication with inlet chamber 14, and main spring 23 is strong enough to maintain this seal against the back pressure of the line fluid.

In the retracted position (Fig. 1) of the mechanism the inlet and outlet chambers 14 and 15 are interconnected and the high pressure seal 51 is open. If through some circumstances such as malfunctioning of the brake or thermal expansion of the brake fluid, the pressure inside casing 11 rises unduly, this pressure may be relieved by unseating ball check valve 70 and blowing off through bypass line 71 into the line fluid. The fluid thus bled from the casing and fluid chamber 15 therein will be replenished on the next actuation of the brake in the manner described in the foregoing.

When the brake system is de-energized, the low pressure seal 66 provides a positive mechanical separator between the line fluid and the brake actuating fluid so that the line fluid pipes may be disconnected for maintenance or repair without necessity for emptying the brake fluid in the brake motors. Alternatively, the brake mechanism may be disconnected without dismantling the line fluid supply. Moreover, if the brake motor should fail while it is engaged, no fluid will be lost from the line supply, because the fluid supply line is isolated from the brake motor during actuation of the brake by the closure of high pressure seal 51.

Variations of the construction may be made within the scope of the appended claims.

I claim:

1. A combination self-replenishing and lock-out mechanism for a hydraulic system comprising a casing, and a member reciprocable in the casing in response to differential fluid pressure, said member having opposed faces defining with said casing a first chamber adjacent one face for containing fluid connected with a fluid-pressure source and a second chamber adjacent the opposing face for containing fluid connected with a fluid motor, means biasing said reciprocable member toward said first chamber to a pre-selected retracted position therein relative to said casing, means carried on said reciprocable member for closing said first chamber from communication with the fluid-pressure source when said reciprocable member is biased to said retracted position, a flow passage through said member normally open for connecting said first chamber with said second chamber, a valve carried by said reciprocable member for opening and closing said passage, said valve including a valve body in said reciprocable member and means biasing said valve body to a normally open position in said passage, and said valve body having fluid actuating surfaces thereon responsive to a predetermined fluid pressure in said first chamber to overcome said valve bias means and to move said valve body to a position to close said passage whenever said reciprocable member is moved in said casing member away from said retracted position toward said second chamber.

2. A combination self-replenishing and lock-out mechanism for a hydraulic system comprising a casing, a member reciprocable in the casing in response to fluid pressure, said member having opposed faces, one face defining with one end of said casing a first chamber for containing fluid connected with a fluid-pressure source, and the opposing face defining with the other end of said casing a second chamber for containing fluid connected with a fluid motor, means biasing said reciprocable member toward said first chamber to a pre-selected retracted position relative to said casing, sealing means on said reciprocable member for closing first chamber from communication with fluid from the pressure source when said reciprocable member is in said retracted position, a flow passage through said reciprocable member from said first chamber to said second chamber, a valve chamber in said reciprocable member, said valve chamber having an end region closed to fluid in either of said first or said second chambers, a valve body reciprocable in said closed end of said valve chamber and including a stem portion projecting through said flow passage into said second chamber and terminating in a valve head in said second chamber for closing said flow passage, means normally biasing said valve body to a position in which said valve head is in open position on said flow passage, and said valve body including an actuating surface in communication with and responsive to a predetermined fluid pressure of fluid in said first chamber to overcome said valve body biasing means and close said valve head on said passage when said reciprocable member is moved in said casing away from said retracted position.

3. A combination self-replenishing and lock-out mechanism for a hydraulic system comprising a casing; a member reciprocable in the casing in response to differential fluid pressure force, said member having opposed faces, one such face defining with one end of the casing a first chamber and the opposing face defining with the other end of the casing a second chamber; a first port for communicating line fluid to said first chamber, and a second port for communicating actuating fluid for a fluid motor to said second chamber; means biasing said reciprocable member toward said first chamber to a pre-selected retracted position therein; a sealing face carried on said reciprocable member for engaging and closing said first port from communication with said first chamber when said reciprocable member is biased to said retracted position; a flow passage through said reciprocable member from said first chamber to said second chamber, said flow passage having a valve seat on the end thereof directed toward said second chamber; a valve body reciprocable inside said reciprocable member, said valve body including a valve stem projecting through said flow passage into said second chamber and a valve head in said second chamber supported by said valve stem and adapted to seat on said valve seat to close said flow passage; means biasing said valve body relative to said reciprocatable member to a position in which said valve head is normally open and away from said valve seat; and a fluid-responsive actuating surface on the valve body communicating with said first chamber and adapted to shift said valve head to a closed position on said valve seat of said flow passage in response to line fluid pressure in said first chamber adequate to displace said reciprocable member from said retracted position.

4. Mechanism according to claim 3 wherein said reciprocable member includes a valve chamber therein in which said valve body is slidably positioned, said valve chamber having one end closed by said valve body to fluid in said first or said second chambers, and means for venting said closed end of said valve chamber to a region outside said casing.

5. Mechanism in accordance with claim 4 in which said venting means comprises a rigid tube communicating at one end to said closed end of said valve chamber, said tube projecting therefrom in slidable sealing engagement through one wall of the casing and terminating at a region outside said chamber of the casing, said tube being slidable through the casing with the movement of said reciprocable member.

References Cited in the file of this patent

UNITED STATES PATENTS

| | | |
|---|---|---|
| 2,381,930 | Schnell | Aug. 14, 1945 |

FOREIGN PATENTS

| | | |
|---|---|---|
| 1,034,547 | France | Apr. 8, 1953 |
| 504,278 | Great Britain | Apr. 19, 1939 |